United States Patent [19]

Ogawa

[11] Patent Number: 4,494,848

[45] Date of Patent: Jan. 22, 1985

[54] DISTANCE MEASURING DEVICE

[75] Inventor: Masahiko Ogawa, Tokyo, Japan

[73] Assignee: Canon Kabushiki Kaisha, Tokyo, Japan

[21] Appl. No.: 408,603

[22] Filed: Aug. 16, 1982

[51] Int. Cl.³ .......................... G03B 7/08; G01C 3/00
[52] U.S. Cl. ......................................... 354/403; 356/1
[58] Field of Search ................. 354/25 R, 25 P, 25 A, 354/25 N, 31, 31 F, 403; 356/1, 4; 250/201, 201 AF

[56] References Cited

U.S. PATENT DOCUMENTS 4,257,705  3/1981  Hosoe et al. ...................... 354/25 A
4,300,824  11/1981  Tokuda et al. .................... 354/25 A

*Primary Examiner*—William B. Perkey
*Attorney, Agent, or Firm*—Toren, McGeady and Stanger

[57] ABSTRACT

A distance measuring device having a light projecting element and a light receiving or sensitive element normally brings a photo-taking lens into an in-focus position in accordance with a signal produced from the light receiving element. When the quantity of light received by the light receiving element exceeds a predetermined level due to high brightness of an object to be photographed, this condition is detected and the lens is either brought into a predetermined position or an in-focus position on the long distance side to avoid a focal deviation for the high brightness object.

18 Claims, 3 Drawing Figures

4,494,848

DISTANCE MEASURING DEVICE

BACKGROUND OF THE INVENTION

1. Field of the Invention

This invention relates to a distance measuring device for a camera of the type arranged to project a light from a light projecting element on an object to be photographed and to measure a distance to the object by detecting with a light sensitive element the light as it is reflected by and coming from the object.

2. Description of the Prior Art

Generally, the conventional distance measuring systems of the type arranged to measure a distance to an object to be photographed by projecting a light from a light projecting element onto the object have been incapable of discerning the light projected on and reflected by the object from the light of the object when the object happens to be of a high degree of brightness. Accordingly, in such a case, the camera either has become incapable of performing a photographing operation or has performed out-of-focus photographing. The conventional solutions of this problem have included a method of using a light projecting LED (light emitting diode) of high output and another method of shortening the measurable range of distance to ensure that the light projected from the light projecting element can be received in sufficient intensity after it is reflected by the object. However, use of an LED of high output not only result in a higher cost but also result in increased power consumption. Particularly, in the case of cameras which are generally required to be in a compact size, the capacity of a battery usable for them is limited. The first solution, therefore, have caused a great inconvenience. Meanwhile, the other solution of shortening the measurable range of distance is hardly compatible with the purposes and usages of cameras.

SUMMARY OF THE INVENTION

It is a general object of the present invention to provide a distance measuring device for a camera which is capable of eliminating the shortcomings of the prior art by utilizing the deep depth of field that is obtainable from the use of a small aperture of the photo-taking lens in photographing an object of high brightness. More specifically stated, in accordance with the invention, in cases where the object to be photographed is of high brightness, the phototaking lens is brought into a predetermined position in which the object is placed within the above stated deep depth of field, so that the high brightness object can be photographed even with a low output light projecting element or even at a low voltage or without shortening the measurable range of distance.

The above and further objects and features of the invention will become apparent from the following detailed description of a preferred embodiment thereof taken in connection with the accompanying drawings.

DESCRIPTION OF THE PREFERRED EMBODIMENT

Figure 1:
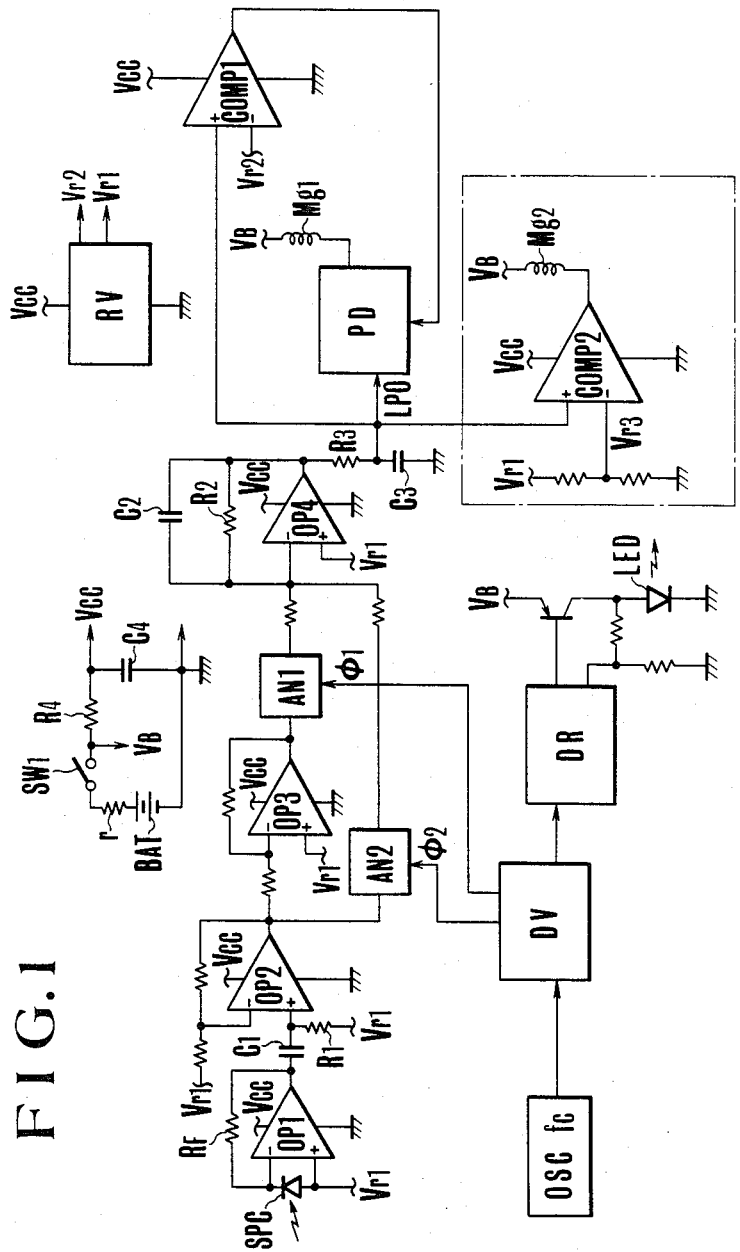
FIG. 1 is a circuit diagram showing the circuit arrangement of an embodiment of the invention.
Figure 2:
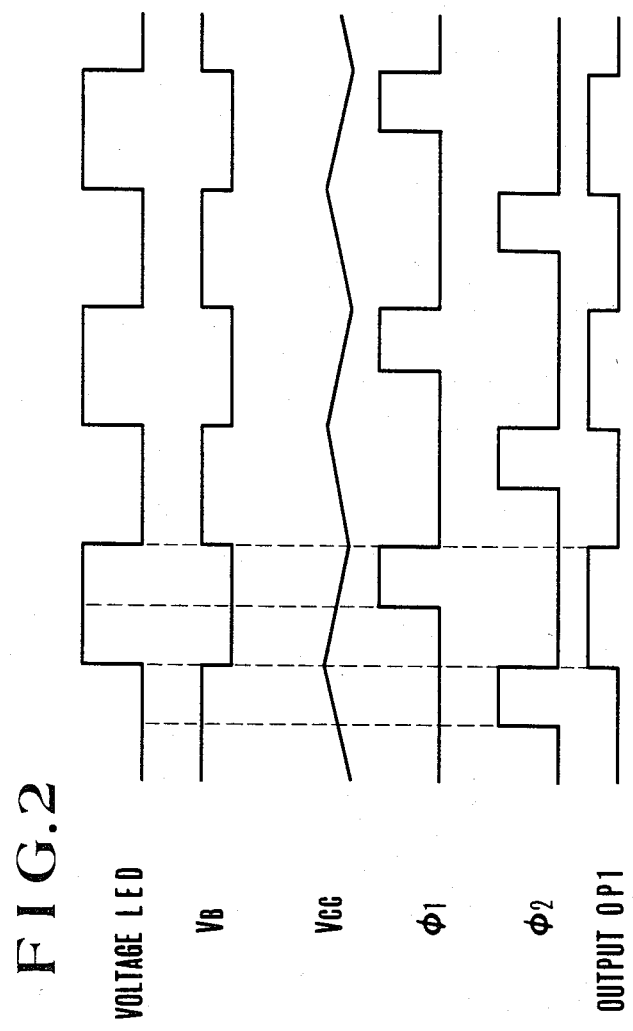
FIG. 2 is a timing chart showing the wave forms of outputs of the essential parts of the circuit arrangement shown in FIG. 1.

Referring to FIG. 1 which shows a preferred embodiment of the invention in a circuit diagram, the embodiment includes a light receiving or sensitive element SPC; a light projecting element LED; operational amplifiers OP1–OP4; an oscillator OSC; a frequency dividing-distributing circuit DV; a light projecting element driving circuit DR; a peak detecting circuit PD; comparators COMP1 and COMP2; magnets Mg1 and Mg2 which bring a photo-taking lens arranged to be moved from an in-focus position on a short distance side to an in-focus position on a long distance side to a stop; a battery BAT; a switch SW1 which closes to give potentials VB and Vcc and to have the power source voltage impressed on the circuit; a reference voltage producing circuit RV arranged to produce reference voltage Vr1 and Vr2, the reference voltage Vr2 being arranged to be higher than the other voltage Vr1; and analog switches AN1 and AN2. When pulses $\phi 1$ and $\phi 2$ such as the pulses shown in FIG. 2 are impressed from the frequency dividing-distributing circuit DV on these analog switches, they become conductive at the timing of a high level.

Figure 3:
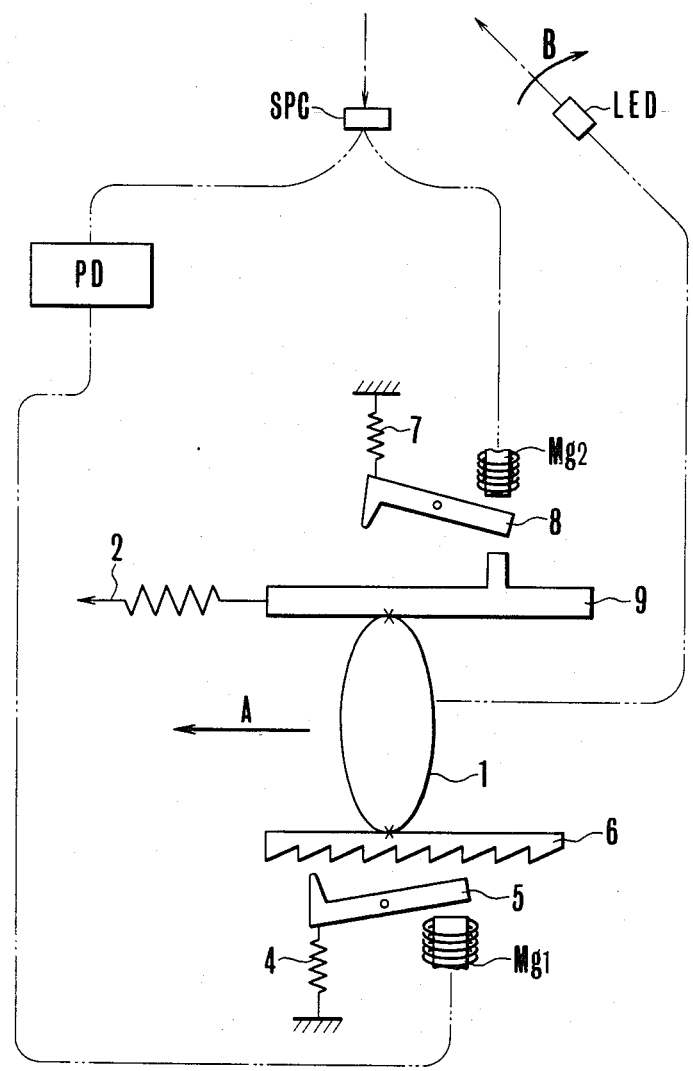
FIG. 3 is a schematic plan view showing the arrangement of a magnet and a lens to be operated by the circuit arrangement shown in FIG. 1.

In cases where the brightness of the object is low, clock pulses fc which are produced from the oscillator OSC is frequency divided and distributed to give sampling pulses $\phi 1$ and $\phi 2$ through the frequency dividing-distributing circuit DV. Then, when the pulses are impressed through the light projecting element driving circuit DR on the light projecting element LED as represented by LED voltage in FIG. 2, a flickering pulse light is projected from the light projecting element LED onto the object. The projected light is reflected by the object. When the reflection light is received at the light sensitive element SPC, the reflected light is current-to-voltage converted by the operational amplifier OP1 which is provided with a feedback resistor RF. Through this process, there appears pulses which are similar to the light projecting element LED driving pulses as represented by "OP1 output" shown in FIG. 2. The output of the operational amplifier OP1 is supplied through a high-pass filter formed a capacitor C1 and a resistor R1 to the operational amplifier OP2 to be amplified there. The output of the operational amplifier OP2 is inverted at the operational amplifier OP3 and is sampled by the analog switch AN1 while the light projecting element LED is alight. Meanwhile, the output of the operational amplifier OP2 is directly sampled by the analog switch AN2 while the light projecting element LED is extinct. The outputs of the analog switches AN1 and AN2 are added up at the operational amplifier OP4. While they are being thus added up the sampling frequency component is removed through an integration circuit formed by a capacitor C2 and a resistor R2. A signal thus obtained is further processed through another integration circuit formed by a capacitor C3 and a resistor R3 to obtain a signal which does not have much noise. In this instance, if there is any reflection light from the object, the output LPO of the integration circuit C3-R3 which is an output of synchronous detection of the reflection light has a higher voltage than the reference voltage Vr1. If there is no reflection light, the voltage of the synchronous detection output LPO is equal to the reference voltage Vr1. The comparator COMP1 compares the synchronous detection output CPO with the reference voltage Vr2 which is set at a higher level than the reference voltage Vr1 in consideration of noises. When the level of the synchronous detection output LPO comes to exceed the reference voltage Vr2, the peak detection circuit DP is actuated by the output of the comparator COMP1. The output of the peak detection circuit DP is normally at a high level to prevent a power supply to the magnet Mg1. However, when the output of the light sensitive element SPC reaches a peak, the level of the output of the peak detection circuit becomes low to allow a power supply to the magnet Mg1. Then, a normal automatic focal point adjusting action takes place and the position of the photo-taking lens is controlled. More specifically, the photo-taking lens 1 is moved in the direction of arrow, as shown in FIG. 3, by an urging force of a spring 2 from an in-focus position on the short distance side to an in-focus position on the long distance side. Then, in association with the movement of the photo-taking lens 1, the light projecting element LED performs beam scanning (or beam sweeping) in a known manner. During the process of beam scanning, the output of the peak detection circuit PD changes to a low level when the light sensitive element SPC receives the reflection of the light projected by the light projecting element LED to the highest degree thus resulting in a peak of the synchronous detection output LPO. With the level of the output of the peak detection circuit PD becoming low, a power supply is effected to the magnet Mg1. Then, the exciting force of the magnet Mg1 causes a locking level 5 which is urged in the counterclockwise direction by a spring 4 to rotate clockwise. A locking lever 5 then engages a ratchet 6 which is arranged into one unified body with the photo-taking lens 1 to bring the lens 1 to a stop at an in-focus position. The automatic focusing operation is accomplished in this manner.

Since the reference voltage Vr3 is lower than the reference voltage Vr1, the output of the comparator COMP2 remains at a high level to prevent the magnet Mg2 from operating.

In cases where the brightness of the object to be photographed is very high, the output of the operational amplifier is saturated. The saturation may be prevented by arranging the feedback resistor RF to be of a smaller value. However, if this resistance value is set at an excessively small value, the signal light which is projected on the object and comes back after it is reflected by the object also become of a smaller value. The signal light then would necessitate arrangement to increase the gain of the operational amplifier OP2. This arrangement then would result in a larger noise component of the output of the operational amplifier OP1. This would results in a distance measurement error because of an insufficient S/N ratio. Therfore, the resistance value of the resistor RF must be set at a value which does not bring about an adverse effect during normal distance measurement. The battery BAT has an internal resistance r. When the light projecting element LED flickers, the potential VB varies to an opposite phase in synchronism with the LED voltage as shown in FIG. 2. Use of the simple low-pass filter consisting of the capacitor C4 and the resistor R4 for the purpose of moderating this variation makes the power source voltage Vcc into a triangular wave form as shown in FIG. 2. Then, with this voltage Vcc impressed on the operational amplifier OP1, when a large current is caused by a high brightness object to flow to the light sensitive element SPC, the operational amplifier OP1 is rendered inoperative as operational amplifier because no feedback takes place for the output of the amplifier OP1 though it is saturated. Therefore, the power source voltage Vcc appears in the output of the amplifier OP1 with the varied state thereof unchanged. Then, the voltage Vcc is amplified through the operational amplifier OP2 and is subjected to sampling with the sampling pulses ∅1 and ∅2 of the phase as shown in FIG. 2. In this instance, the sampling is done on the lower side of the power source voltage Vcc when the light projecting element LED is alight and on the upper side thereof when the element LED is extinct. Therefore, the synchronous detection output LPO thus obtained is opposite to the signal light obtained when the object is of ordinary brightness. In other words, the voltage of the synchronous detection output LPO is lower than the reference voltage Vr1. Then, the peak detection circuit PD does not operate and the magnet Mg1 also remain inoperative. Whereas, if the reference voltage Vr3 is arranged to be higher than the synchronous detection output LPO obtained with the operational amplifier OP1 saturated, the output of the comparator COMP2 becomes a low level to allow a power supply to the magnet Mg2. Then, the locking lever 8 which is urged clockwise by the spring 7 as shown in FIG. 3 is pulled in the counterclockwise direction by the magnet Mg2. The locking lever then sets the photo-taking lens 1 in a predetermined position by coming to engage a protrudent part 9a of a lens stopping lever 9. It goes without saying that this predetermined lens position is a position in which the photo-taking distance is covered by the depth of field derived from a stopped-down aperture value of the photo-taking lens according to the high brightness of the object to be photographed.

Further, in cases where the photo-taking lens intrinsically has a deep depth of field, the number of zones in which the lens to be stopped may be lessened. In such a case, the circuit portion which is encircled with a broken line can be omitted and the lens can be set in a zone on the longest distance side.

In accordance with the invention, as described in detail in the foregoing, the problem that arises from the distance measurement of the type arranged to be accomplished by detecting the reflection of a projected light concerning how to discern the reflection from a natural light can be solved by ensuring accurate measurement for a high brightness object with the use of an inexpensive LED and the accurate measurement can be carried out covering a wide range from a short distance to a long distance.

What I claim:

1. A distance measuring device to project a distance measuring signal onto an object and receive a signal reflected therefrom thereby measuring a distance to said object, comprising:
   (A) signal receiving means for receiving said distance measuring signal reflected from the object;
   (B) distance indicating means for indicating a distance to the object depending on an output of the signal receiving means;
   (C) detection means for detecting when the signal receiving means is placed in a saturated state by external noise elements received together with the distance measuring signal, said detection means being arranged for regulating the operation of the distance indicating means when the saturated state is detected.

2. A device according to claim 1, wherein said distance indicating means comprises:
   first stopping means for stopping a photo-taking lens at an in-focus position.

3. A device according to claim 2, wherein the first stopping means comprises electromagnetic means for converting an electrical signal to a mechanical signal.

4. A device according to claim 2, further comprising:
   second stopping means for detecting when the signal receiving means is placed in a saturated state by external noise elements received together with the distance measuring signal and for stopping the photo-taking lens at a predetermined position.

5. A device according to claim 4, wherein the second stopping means comprises electromagnetic means for converting an electrical signal to a mechanical signal.

6. A distance measuring device to project a distance measuring light onto an object and receive light reflected therefrom thereby measuring a distance to said object, comprising:
   (A) light projecting means for projecting and causing flickering of said light measuring light at a predetermined cycle;
   (B) light receiving means for receiving the distance measuring light projected on the object and reflected therefrom, said light receiving means being arranged for receiving external noise light besides the distance measuring light and producing a signal corresponding to a total amount of light thus received so that the signal level produced by the light receiving means becomes high corresponding to an increase in the amount of light received and reaches a saturated state when the total light receiving level reaches a prescribed level or higher in response to the noise light;
   (C) means connectable to a power source to drive the light projecting means and the light receiving means, said power source when connected having its output level lowered when the light projecting means is lit and its output level raised when the light projecting means is extinguished, so that the light receiving means has the level of its output signal lowered when the output level of the power source is low and has the level of its output signal raised when the output level of the power source is high depending on the output level of the power source when the saturated state is generated without relation to a variation in an amount of light received;
   (D) distance indicating means for indicating the distance to the object corresponding to the output signal of the light receiving means; and
   (E) comparison means for comparing the level of the output signal of the light receiving means when the light projecting means is lit with the level of the output signal of the light receiving means when the light projecting means is extinguished, said comparison means being arranged for regulating the operation of the distance indicating means when the level of output signal of the light receiving means corresponds to the saturated state.

7. A device according to claim 6, further comprising:
   discerning means for discerning the output signal of the light receiving means to produce a first signal at a time the light projecting means is lit and to a second signal at a time the output signal of the light receiving means is extinguished.

8. A device according to claim 7, wherein the comparison means further comprises:
   (a) operation means to produce a relationship in size of the respective output signals of the light receiving means corresponding to a time the light projecting means is lit and to a time the same is extinguished; and
   (b) regulating means to regulate the distance indicating means when the relationship in size of the levels of the output signals of the light receiving means when the light projecting means is lit and when the same is extinguished falls in a range prescribed by the output of the operation means.

9. A device according to claim 8, wherein said prescribed range is set in a range in which the level of the output signal of the light receiving means when the light projecting means is lit becomes larger than that when the same is extinguished.

10. A device according to claim 9, wherein the distance indicating means comprises:
    first stopping means for stopping a photo-taking lens at an in-focus position.

11. A device according to claim 10, wherein the first stopping means comprises electromagnetic means for converting an electrical signal to a mechanical signal.

12. A device according to claim 11, further comprising:
    second stopping means for detecting the saturated state to stop the photo-taking lens at a prescribed position.

13. A device according to claim 12, wherein the second stopping means comprises electromagnetic means for converting an electrical signal to a mechanical signal.

14. A distance measuring device having light projecting means and light receiving means, said device comprising:
    signal producing means capable of producing a signal corresponding to quantity of light received by said light receiving means, said signal producing means being arranged to operate when said quantity of light does not exceed a predetermined level;
    peak detecting means for detecting the peak of said quantity of light through the output of said signal producing means;
    distance indicating means for indicating a distance to an object whose distance is to be measured according to a detection signal produced by the peak detecting means;
    inoperativeness indicating means for indicating an inoperative state when said signal producing means is rendered inoperative by the level of the quantity of light received;
    first converting means for converting an indicating signal produced from said distance indicating means into a mechanical signal;
    second converting means for converting an indicating signal produced from said inoperativeness indicating means into a mechanical signal;
    a movable photo-taking lens;
    first stopping means for stopping said photo-taking lens in an in-focus position in accordance with a signal from said first converting means; and
    second stopping means for stopping said photo-taking lens at a predetermined position in accordance with a signal from said second converting means.

15. A distance measuring device according to claim 14, wherein said first or second converting means includes electromagnetic means.

16. A distance measuring device having light projecting means and light receiving means, said device comprising:

a power source arranged to drive said light projecting means to operate in a flickering manner;

signal producing means capable of producing a signal which is variable according to the quantity of light received by said light receiving means, said signal producing means being arranged to be rendered operative by said power source and to produce an output corresponding to variation of said power source when said quantity of light exceeds a predetermined level;

difference detecting means for detecting a difference arising in the output of said signal producing means between a condition in which a light is projected by the light projecting means and another condition in which no light is projected, said difference detecting means for detecting difference between the output of the signal output means when the light projecting means is in a light-projecting state and the output of the signal output means when the light projecting means is in a non-light projecting state, said difference being detected as a difference of one of the outputs from the other which has been predetermined;

peak detecting means which is arranged to be operative when the output difference detected by said difference detecting means is within a predetermined range of levels, said peak detecting means being arranged to detect the peak of said output difference;

distance indicating means for indicating a distance to an object of distance measurement in accordance with a detection signal produced by said peak detecting means;

inoperativeness indicating means for indicating a condition in which the output difference detected by said difference detecting means is at a level within a level range which differs from said predetermined level range;

first converting means for converting an indicating signal produced from said distance indicating means into a mechanical signal; and second converting means for converting an indicating signal produced from said inoperativeness indicating means into a mechanical signal.

17. A distance measuring device according to claim 16, wherein said first or second converting means includes electromagnetic means.

18. A distance measuring device according to claim 16 further including:

a movable photo-taking lens;

first stopping means for stopping said photo-taking lens in an in-focus position in accordance with a signal from said first converting means; and second stopping means for stopping said photo-taking lens at a predetermined position in accordance with a signal from said second converting means.

* * * * *

UNITED STATES PATENT AND TRADEMARK OFFICE
CERTIFICATE OF CORRECTION

PATENT NO. : 4,494,848
DATED : January 22, 1985
INVENTOR(S) : Masahiko Ogawa

It is certified that error appears in the above-identified patent and that said Letters Patent is hereby corrected as shown below:

In the heading of the Patent it should read:

[30] Foreign Application Priority Data

Aug. 24, 1981 [JP]    Japan ............56-132474

Signed and Sealed this

Eighth    Day of    October 1985

[SEAL]

Attest:

DONALD J. QUIGG

Attesting Officer

Commissioner of Patents and
Trademarks—Designate